Figure 1:
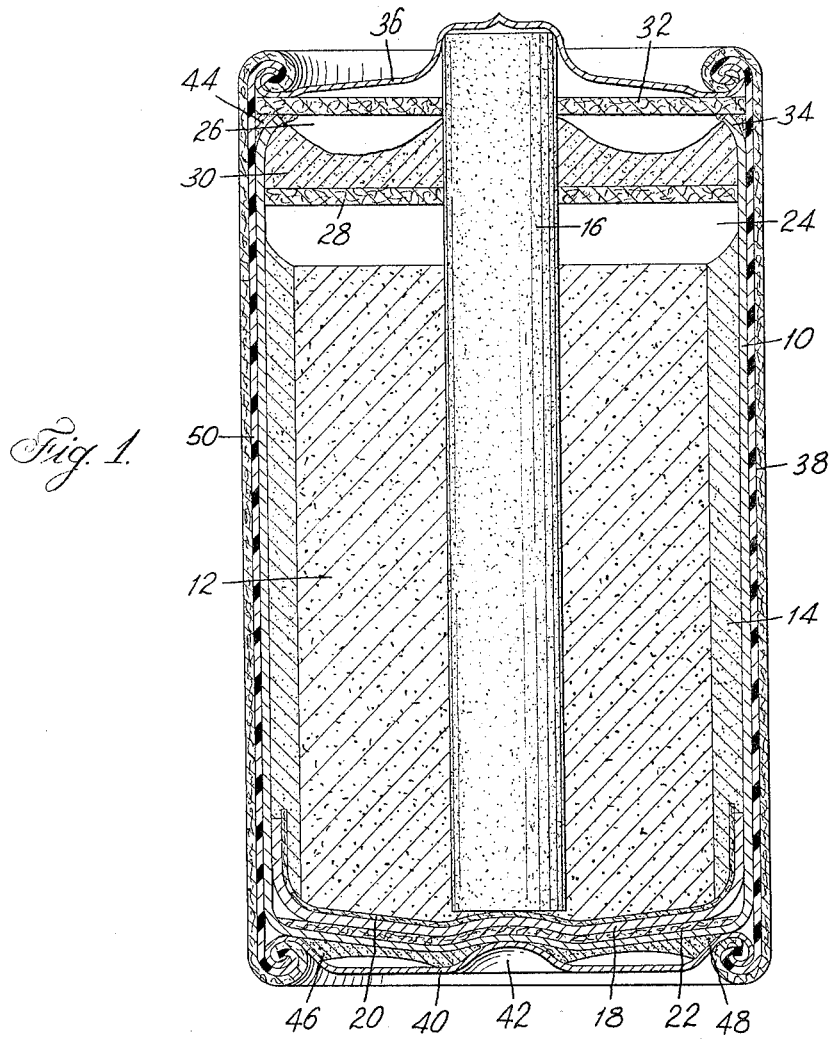

Oct. 11, 1966     T. A. REILLY ETAL     3,278,339

PRIMARY DRY CELLS

Filed April 20, 1964

INVENTORS
THOMAS A. REILLY
HARRY K. BISHOP
JOHNSON R. BECKMAN

BY John R. Haherty
ATTORNEY 3,278,339
PRIMARY DRY CELLS
Thomas A. Reilly, Bay Village, Ohio, Harry K. Bishop, West Covina, Calif., and Johnson R. Beckman, Cleveland, Ohio, assignors to Union Carbide Corporation, a corporation of New York
Filed Apr. 20, 1964, Ser. No. 360,951
3 Claims. (Cl. 136—107)

This invention relates to primary dry cells.

Primary dry cells are one of the most familiar articles of commerce and are widely used in flashlights, portable radios, photoflash and other devices. One common problem that has been encountered in the use of dry cells is that of leakage of liquid exudate during and after use of the cell. This problem is a particular vexing one since the liquid exudate is corrosive and can damage the device in which the dry cells are used.

Dry cell manufacturers have adopted a more or less common approach to the solution of this problem, that is, to encase the dry cell within a closed container comprising a non-corrodible jacket surrounding the cupped electrode of the cell and having a top and bottom closure locked thereto. One type of noncorrodible jacket that has been used comprises a multiple-ply tube of a fibrous cellulosic material, such as kraft paper. This type of jacket is ideal for most dry cells since it is lightweight and strong, and since it is relatively inexpensive and easy to manufacture. However, the jacket is absorbent to liquid and although it has been used as a liquid reservoir to retain leakage within the cell, under extreme or abusive conditions of use the jacket may become so thoroughly soaked that it may lose its strength and ability to retain the liquid exudate and to prevent its leakage from the cell.

In the copending application Serial No. 285,655 of T. A. Reilly and J. R. Beckman, filed on June 5, 1963 and assigned to the common assignee herein, there is disclosed a multiple-ply, laminated tube of improved structure and method of manufacturing the same, which tube is ideally suited for use as the jacket in a primary dry cell. Broadly, this multiple-ply, laminated tube comprises the usual fibrous cellulosic material, e.g., kraft paper, but has an innermost layer or ply of a high strength, liquid impermeable plastic material. This innermost layer or ply constitutes a liquid impermeable barrier which liquid cannot penetrate and become soaked into the tube, thereby destroying its ability to retain the liquid.

The present invention contemplates the use in a primary dry cell of a noncorrodible jacket of the above multiple-ply, laminated tube structure, which will be hereinafter described in greater detail, and has for its principal object to thereby improve upon the leakage resistance of a dry cell. Another object is to provide an improved primary dry cell in which a novel seal arrangement is used in order to vent gases from within the cell but without at the same time permitting the leakage of liquid during or after use of the cell.

Figure 2:
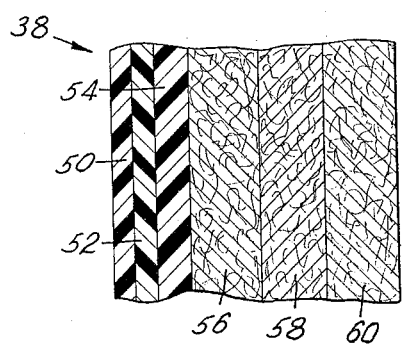

Other objects and advantages of the invention will become apparent from the following description, taken in conjunction with the accompanying drawing, in which:

FIGURE 1 is an elevational view in section of a primary dry cell embodying the invention; and FIGURE 2 is an enlarged, fragmentary view of a portion of the dry cell jacket shown in FIGURE 1.

In accordance with the invention, a primary dry cell comprising a cupped electrode of a consumable metal having therein a depolarizer mix, electrolyte and a carbon electrode embedded within the depolarizer mix, is provided with a noncorrodible jacket of a multiple-ply, laminated tube structure and having a liquid impermeable barrier therein and which has locked thereto the conventional top and bottom closures for the cell. Below the top closure is a displaceable inner seal which is capable of venting gases from within the cell through the carbon electrode but without permitting the leakage of liquid, and a bead type seal is positioned between the upper edges of the cupped electrode and the jacket. Within the bottom of the cell, a protective shield may be provided for the bottom closure in order to protect it against corrosion during and after use of the cell.

More particularly, the multiple-ply, laminated tube from which the dry cell jacket of the invention is made comprises a first laminate of a high strength, liquid impermeable plastic material and a thermoplastic material, and a second laminate of a thermoplastic material and a fibrous cellulosic material, the thermoplastic material of the first and second laminates being united together by autogenous action under heat. The laminated tube may be and preferably is made by spirally winding the laminates together with the thermoplastic material of each laminate adjacent the other and by then heating the laminates to a temperature at which the thermoplastic materials bond together and form a strong, unit structure as more particularly disclosed in the Reilly et al. application.

In one form of the multiple-ply, laminated tube that is suited for use as the jacket in a dry cell, the first laminate may be composed of poly(ethylene terephthalate), which is a particular high strength, liquid impermeable plastic, and polyethylene, and the second laminate may be composed of polyethylene and one or more layers or plies of kraft paper. Other suitable liquid impermeable plastic materials, besides poly(ethylene terephthalate), include the thermoplastic polyhydroxyethers, such as poly [oxyphenyl - 2,2-propylenephenoxy-2-hydroxy-1,3-propylene] which is the condensation product of equimolar amounts of epichlorohydrin and bisphenol A. The thermoplastic material used in the laminated tube is preferably a flexible plastic having a softening point lower than that of the liquid impermeable plastic and may include, besides polyethylene, polyvinylidene chloride, polyvinyl chloride, polypropylene, polystyrene, mixtures thereof and the like. The fibrous cellulosic material, e.g., kraft paper, may be bonded to the thermoplastic material by a polyvinylacetate water emulsion which is commonly used in adhering paper, but many other suitable adhesives and glues may be used as will be apparent to those skilled in the art.

Referring now to FIGURE 1 of the drawing, a primary dry cell embodying the invention may comprise a cupped electrode 10 of a consumable metal (e.g., zinc) having therein a depolarizer mix 12, an immobilized electrolyte 14 and a porous carbon electrode 16 embedded within the depolarizer mix 12. Both the depolarizer mix 12 and the carbon electrode 16 may be suitably provided in the form of a conventional bobbin. Separating the bobbin from the bottom of the cupped electrode 10 is a conventional bottom insulating washer 18, suitably of cardboard or paper. Atop the washer 18 is a fibrous or paper cup 20 which fits around the bottom edges of the depolarizer mix 12. In order to completely isolate the bottom of the cupped electrode 10 from the cell electrolyte and to prevent its consumption during discharge, an oil impregnated fibrous or paper disc 22 may be positioned beneath the washer 18 if desired.

Just below the upper edges of the cupped electrode 10 and so placed as to define a lower free space 24 above the depolarizer mix 12 and an upper free space 26 is an inner seal comprising a top collar 28 and a soft seal 30 supported thereon. The soft seal 30 should be displaceable under pressure and may be composed of asphalt or a microcrystalline wax, for example. The top collar 28 is also displaceable and fits tightly within the upper end of the cupped electrode 10 and around the carbon electrode 16. The top collar 28 is liquid impermeable and serves as a liquid barrier, and may be made of paper or other fibrous material which is coated with a liquid-repellant material, for example, a plastic such as polyethylene. Spaced above the soft seal 30 and within the upper free space 26 is a venting washer 32. The washer 32 fits tightly around the carbon electrode 16 and rests on the upper peripheral edges of the cupped electrode 10, which peripheral edges are turned slightly inwardly as indicated at 34. The washer 32 should be gas-permeable and electrically nonconductive and may be composed of porous paper or cardboard.

The top closure of the cell may comprise a one-piece metal plate 36. As clearly shown in FIGURE 1, this top closure plate 36 is shaped to fit over the top edges of the carbon electrode 16 and has its outer peripheral edges locked in liquid-tight engagement with the noncorrodible jacket 38. Similarly, the bottom closure may comprise a metal plate 40 positioned beneath the cupped electrode 10 and having its outer peripheral edges locked in liquid-tight engagement with the jacket 38. The bottom closure plate 40 may also be provided with a central indentation as at 42 which makes electrical contact with the bottom of the cupped electrode 10. In the construction of the dry cell shown in FIGURE 1, the top closure plate 36 is locked in liquid but not gas tight engagement with the jacket 38.

As shown in FIGURE 1, the juncture between the top closure plate 36 and the jacket 38 is positioned over the top of the venting washer 32 and just above the upper peripheral edges of the cupped electrode 10. By this construction, the top closure plate 36 is electrically insulated from the cupped electrode 10 and the washer 32 is firmly held in place. It will be noted that the washer 32 is slightly larger in diameter than the upper end of the cupped electrode 10 and that its outer edges abut tightly against the interior side walls of the jacket 38. Underlying the washer 32 in the space left by the inwardly turned edges of the cupped electrode 10 is a bead seal 44 of wax, for example. This bead seal 44 extends around the periphery of the cupped electrode 10 and adheres to both the cupped electrode 10 and the jacket 38. It will thus be seen that any electrolyte or exudate which may escape from within the cupped electrode 10, due to perforation of its side walls during discharge, and which passes between the cupped electrode 10 and the jacket 38 is barred by the bead seal 44 from contact with the top closure plate 36.

The dry cell construction shown in FIGURE 1 may also be provided with a protective shield for the bottom closure plate 40 in order to isolate it from the cell electrolyte or exudate and the protect it against corrosion. Suitably, the shield may comprise a layer 46 of microcrystalline wax, for example, which is applied and adhered to the bottom of the cupped electrode 10, except in the area where the bottom plate 40 makes electrical contact with the cupped elecrode 10. In this construction, it is important that the wax layer 46 be applied in such manner as to form a liquid impermeable seal around the interior portion of the locked juncture between the bottom plate 40 and the jacket 38 as shown at 48. It should be mentioned that while this protection or shield arrangement for the bottom closure plate 40 is desirable, and especially where the dry cells are to be subjected to severe and abusive conditions, e.g., long, continuous and heavy drain, etc., it is not altogether necessary where the cells are to be subjected to ordinary use and may be considered as optional for the purposes of the invention.

FIGURE 2 shows in enlarged detail the multiple-ply, laminated tube structure of the jacket 38 used in the dry cell of the invention. As shown, the jacket 38 comprises a first or innermost ply 50 of a high strength, liquid impermeable plastic material, e.g., poly(ethylene terephthalate), which is positioned adjacent to the outer side walls of the cupped electrode 10 (FIGURE 1) and which serves as a liquid impermeable barrier, and a second ply 52 of thermoplastic material, e.g., polyethylene. Both the first and second plies 50, 52 of liquid impermeable and thermoplastic material constitute the first laminate in the manufacture of the improved laminated tube of the Reilly et al. application. The second laminated of the tube comprises a ply 54 of thermoplastic material and three plies 56, 58 and 60 of a fibrous cellulosic material, such as kraft paper.

Having described the features of a primary dry cell embodying the invention, its mode of operation may now be explained. During use of the cell and especially under severe conditions, gas is released. This gas normally follows a path from within the depolarizer mix 12 directly into the porous carbon electrode 16 or into the lower free space 24 above the depolarizer mix 12. The gas that enters the free space 24 then passes through the carbon electrode 16 into the upper free space 26 from where all of the gas is vented through the locked juncture between the top closure plate 36 and the jacket 38.

As indicated above, this locked juncture is made liquid but not gas tight and is capable of venting gas from the cell. At the same time, liquid electrolyte or exudate passes into the lower free space 24 where it collects together with gas that is generated in the cell. If the gas and/or liquid pressure in the free space 24 builds up to a high level, the top collar 28 and the soft seal 30 of asphalt or wax are forced in an upward direction, i.e., towards the top closure plate 36, providing additional volume within the free space 24 for the gas and liquid and thereby relieving the pressure therein. In the conventional dry cell, the liquid or exudate is normally forced ahead of the gas and may enter the venting paths through the top closure, thereby blocking off these paths to the passage of the gas from the cell. This problem is overcome by the displaceable inner seal of the invention and particularly the top collar 28 which, when displaced upwardly by gas or liquid pressure in the lower free space 24, causes the soft seal 30 to bear tightly against the carbon electrode 16 and the inner side walls of the cupped electrode 10, thereby effectively sealing off the upper free space 26. It should be noted that despite the displacement of the inner seal, the venting paths for the gas, i.e., through the carbon electrode 16 and the upper free space 26, still remain open. Any gas that may become entrapped between the top venting washer 32 and the soft seal 30 is easily vented through the washer 32 which is made of a gas-permeable material as described above. It may also be mentioned that to prevent the liquid or exudate within the free space 24 from passing into the porous carbon electrode 16, the electrode is preferably made of a fine grain carbon and is waterproofed by impregnation with a solution containing a microcrystalline wax dissolved in a suitable solvent, such as ethylene dichloride. Thus, gas is continuously vented and no substantial gas pressure is allowed to build up in the cell.

In the event perforation of the cupped electrode 10 should occur due to normal consumption of the zinc during discharge, the liquid electrolyte or exudate that escapes from within the cell is prohibited from penetrating and becoming soaked into the jacket 38 by the innermost layer or ply 50 of liquid impermeable material, e.g., poly(ethylene terephthalate), which constitutes a liquid impermeable barrier. This liquid or exudate will normally collect between the jacket 38 and the side walls of the cupped electrode 10. For the purpose of retaining this liquid but without causing the jacket 38 to bulge, it is generally good practice to fit the jacket 38 loosely around the cupped electrode 10 in order to provide a free space or exudate chamber for the liquid (not shown in the drawing). If the liquid or exudate should collect within this space or chamber in any significant amounts, the liquid will normally force its way either towards the top or bottom closure, or both. Should this liquid come into contact with the top closure plate 36, it could very likely corrode the plate which may then become perforated and permit leakage from the cell. However, it will be noted that in the present dry cell construction the peripheral bead seal 44, which is positioned between the jacket 38 and upper edges of the cupped electrode 10, bars the liquid from reaching the top closure plate 36 and corroding it. Additionally, the bead seal 44 prohibits the liquid from passing into the upper free space 26 where it might otherwise block the paths for venting gas from the cell.

When the dry cell of the invention is also provided with the bottom closure protection described hereinabove, the shield consisting of the wax layer 46 effectively bars the liquid or exudate from reaching the bottom closure plate 40 and corroding it. An additional benefit of this bottom protection is that the creation of an "electrolytic couple" between the bottom of the cupped electrode 10, which is normally made of zinc, and the bottom plate 40, which is made of steel, for instance, is avoided since the liquid is not allowed to contact either one of these elements. In prior dry cells, this electrolytic couple has proven to be a particularly troublesome problem when the cell is subjected to severe or abusive use since it can cause large quantities of gas to be generated. Of significance, the combination of the oil impregnated washer 20, which serves to prohibit early consumption of the bottom of the cupped electrode 10, and the wax layer 46 afford particularly good bottom closure protection when used together, even under the most severe conditions of use. Other shield arrangements for the bottom closure of the dry cell may of course be used; for instance, a molded plastic disc may be fitted against the bottom of the cupped electrode 10 as substantially disclosed and claimed in our United States Patent No. 3,115,429, issued on December 24, 1963. However, as noted hereinabove, the shield arrangement is not altogether necessary for dry cells to be used under ordinary conditions and its disclosure herein is not to be taken in any way as limiting the invention.

A particularly important advantage of the dry cell jacket of the invention is that leakage of liquid or exudate through the locked juncture between the top and bottom closures and the jacket due to a so-called "wicking effect" is eliminated. In prior dry cell constructions where the jacket has been made of a fibrous cellulosic material, or even in those cells where a liquid impermeable barrier layer has been incorporated but as an intermediate ply in the jacket, the liquid or exudate would normally become soaked into the first or innermost fibrous ply of the jacket and would eventually creep into or wick through the locked juncture, resulting in leakage from the cell. In the construction of the present dry cell, the jacket 38 incorporates a liquid impermeable barrier in the first or innermost ply 50 which the liquid cannot penetrate, and additionally this first or innermost ply 50 actually forms a seal between the jacket and both the top and bottom closure plates 36, 40 as shown in FIGURE 1.

Although the construction of the dry cell of the invention is quite different from conventional construction, an advantage is that its manufacture is simple. The active elements of the cell, the cupped electrode, carbon electrode, depolarizer mix and electrolyte, are all assembled in the conventional manner. The electrolyte may be provided in the form of a "paste," but an electrolyte-wet bibulous paper separator may also be used.

After the active elements are assembled, the top closure plate 36 is locked to the jacket suitably by tightly curling or spinning its peripheral edges into engagement with the upper edges of the jacket. Since this locked engagement should be capable of venting gas from within the cell, only sufficient pressure is exerted to liquid tightly engage the edges of the top closure 36 and the jacket. If desired, the locked juncture may also be made gas tight, but in this case other venting means must be provided in the top closure. Venting washer 32 is then tightly fitted within the jacket and just below the top closure plate 36. In order to form the bead seal 44 around the peripheral edges of the cupped electrode, a layer of wax, for example, may be placed just beneath the outer edges of the washer 32. Alternatively, the wax layer may be applied directly to the edges of the cupped electrode, if so desired. The displaceable inner seal, i.e., the top collar 28 and the soft seal 30 of asphalt or wax, for example, is placed around the carbon electrode and the seal 30 is heat softened, suitably by use of a torch, in order to insure proper sealing of the open end of the cupped electrode. The cupped electrode is then inserted into the jacket through its bottom open end, the jacket preferably fitting rather loosely over the cupped electrode as indicated before. To aid in forming the bead seal 44, the wax layer applied to the underneath side of the washer 32 may be heated slightly prior to inserting the cupped electrode into the jacket. As shown in FIGURE 1, the wax forming the bead seal 44 preferably flows underneath the venting washer 32 and effectively seals off the joint between the washer 32 and the upper edges of the cupped electrode.

When the bottom closure protection is used in the dry cell of the invention, the wax layer 46 is first applied to the bottom of the cupped electrode and then the bottom closure 40 is assembled. In order to insure that the wax layer 46 forms a seal around the locked juncture of the bottom closure as before described, the bottom of the dry cell after assembly may be heated slightly, for instance, by induction heating, and the cell turned on its lower edge and rotated to uniformly distribute the wax. The bottom closure plate 40 is locked to the jacket in the same manner as described above for the top closure, and this bottom closure may also be made liquid but not gas tight if desired.

In the manufacture of dry cells embodying the invention, the jackets have been composed of multiple-ply, laminated tubes comprising a first laminate of 0.0005 inch of poly(ethylene terephthalate) and 0.0005 inch of polyethylene. The second laminate was composed of 0.001 inch of polyethylene, which was bonded to the polyethylene of the first laminate by autogenous action under heat, and 0.006 inch kraft paper with two successive layers or plies of 0.0045 inch kraft paper bonded to the first layer or ply of kraft paper by a polyvinyl acetate water emulsion adhesive sold as "National" glue.

Dry cells embodying the invention have been subjected to tests ranging from normal usage to severe abuse. These tests demonstrated the effectiveness of the invention, for cells of a conventional construction and not having a jacket of the multiple-ply, laminated tube structure and the displaceable inner and peripheral bead seals described herein showed evidence of leakage while those cells of the invention showed little or no leakage, and where the cells did leak under abusive use, the percentage of failures was comparatively far smaller in the case of the dry cells of the invention.

It will be apparent that various modifications of the dry cell described herein may be made without departing from the spirit and scope of the invention.

We claim:
1. A primary dry cell comprising, in combination, a cupped electrode of a consumable metal having an upper open end, the peripheral edges of which are turned slightly inwardly; a depolarizer mix and an electrolyte disposed within said cupped electrode; a central porous carbon electrode embedded within said depolarizer mix; a non-corrodible jacket surrounding said cupped electrode and composed of a multiple-ply, laminated tube structure comprising a first laminate of a high strength, liquid impermeable plastic material and a thermoplastic material and a second laminate of a thermoplastic material and a fibrous cellulosic material, the thermoplastic material of said first and second laminates being bonded together by autogenous action under heat; a metallic top closure fitted over the top of said carbon electrode, said top closure having its outer edges locked in liquid-tight en- gagement with said jacket and having gas venting means therein, said liquid impermeable plastic material of said laminated tube being disposed in sealing relation against the outer edges of said top closure; a displaceable inner seal positioned within said open end of said cupped electrode and between said top closure and said depolarizer mix and extending from around said carbon electrode to the inner side walls of said cupped electrode, defining a lower free space between said seal and said depolarizer mix for the collection of liquid from said cell and an upper free space between said seal and said top closure for the passage of gas from within said cell and through said gas venting means in said top closure, said inner seal being displaceable in a direction towards said top closure in response to gas pressure from said cell and being capable of sealing off said upper free space from the liquid in said lower free space even under the influence of said gas pressure; a gas permeable venting washer fitted around said carbon electrode and over the upper peripheral edges of said cupped electrode within said upper free space, the outer edges of said venting washer abutting against the interior wall of said jacket; and a peripheral bead seal disposed below said venting washer in the space left by the inwardly turned upper edges of said cupped electrode and between said cupped electrode and said interior wall of said jacket.

2. The primary dry cell defined by claim 1 in which a metallic bottom closure is disposed in contact with the bottom of said cupped electrode with its outer edges locked in liquid-tight engagement with said jacket and in which a layer of a liquid impermeable material is adhered to said bottom of said cupped electrode.

3. The primary dry cell defined by claim 1 in which said top closure comprises a one-piece metal plate.

References Cited by the Examiner
UNITED STATES PATENTS

| | | | |
|---|---|---|---|
| 2,706,214 | 4/1955 | Arbogast | 136—133 |
| 2,850,558 | 9/1955 | Urry | 136—133 |
| 2,773,926 | 12/1956 | Glover | 136—107 |
| 3,090,824 | 5/1963 | Reilly et al. | 136—133 |

WINSTON A. DOUGLAS, *Primary Examiner.*

A. S. KAPARS, *Examiner.*